Ralph H. Boynton's Spoke Machine.

Plate 1.

Reissued Aug 30 1870

4109

Witnesses.
R. H. Campbell
J. A. Coupler

Inventor.
Ralph H. Boynton
by his atty
Mason, Fenwick & Lawrence

Ralph H. Boynton's Spoke Machine.

Plate 2.

Witnesses:
R. T. Campbell
J. N. Cropley

Inventor
Ralph H. Boynton
by his atty
Mason Fenwick & Lawrence

Ralph H. Boynton's Spoke Machine

Plate 3.

Witnesses
R. Thompson
J. N. Campbell

Inventor
Ralph H. Boynton
by his Attys
Mason, Fenwick & Lawrence

UNITED STATES PATENT OFFICE.

RALPH H. BOYNTON, OF OSHKOSH, WISCONSIN.

IMPROVEMENT IN SPOKE-MACHINES.

Specification forming part of Letters Patent No. 52,130, dated January 23, 1866; Reissue No. 4,109, dated August 30, 1870.

*To all whom it may concern:*

Be it known that I, RALPH H. BOYNTON, of Oshkosh, in the county of Winnebago and State of Wisconsin, have invented certain new and useful Improvements in Spoke-Dressing Machinery; and I do hereby declare that the following is a full, clear, and exact description thereof, reference being had to the accompanying drawings, making part of this specification, in which—

Figure 1:
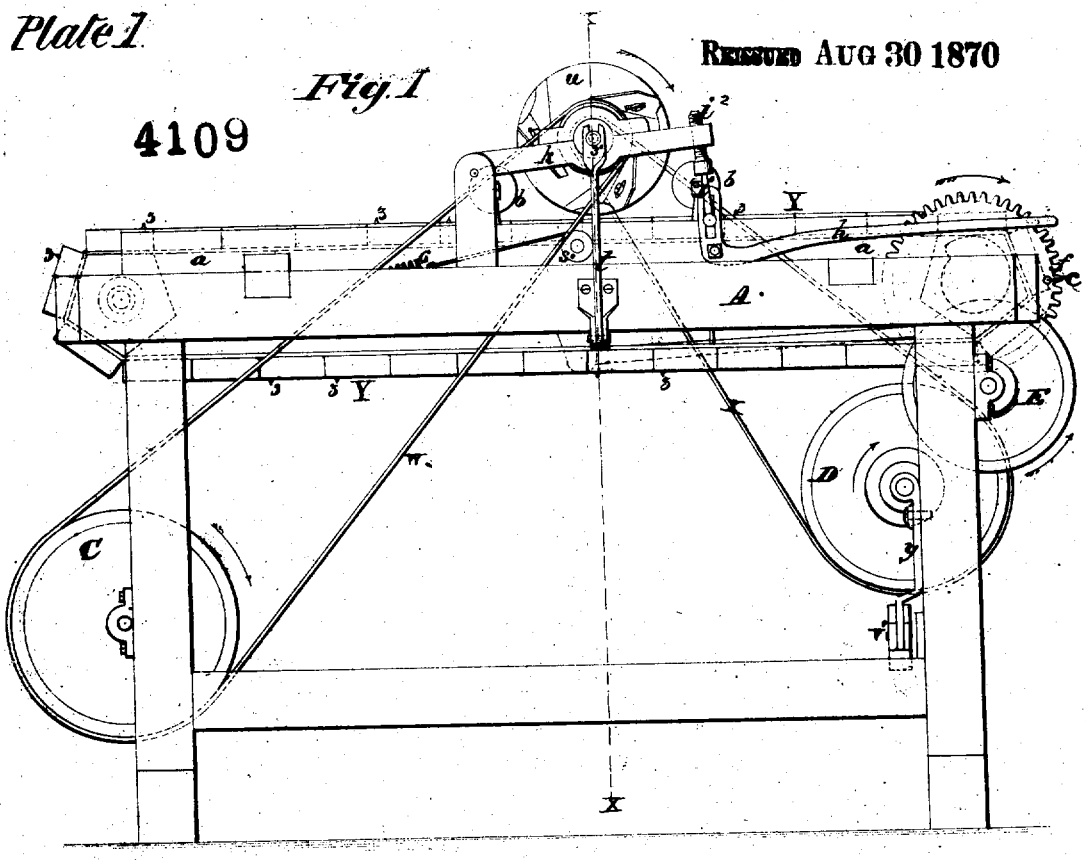
Figure 2:
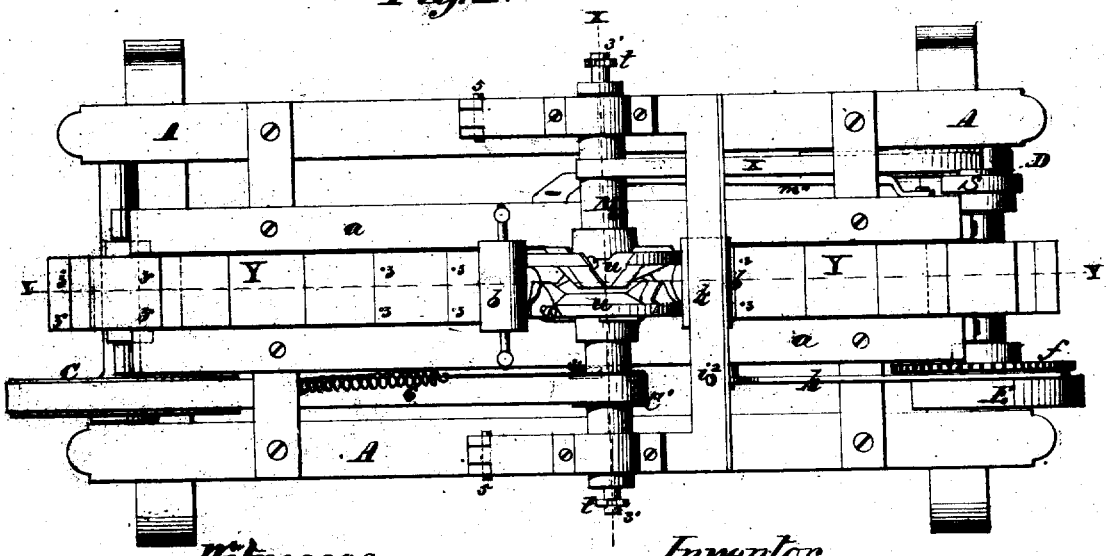
Figure 3:
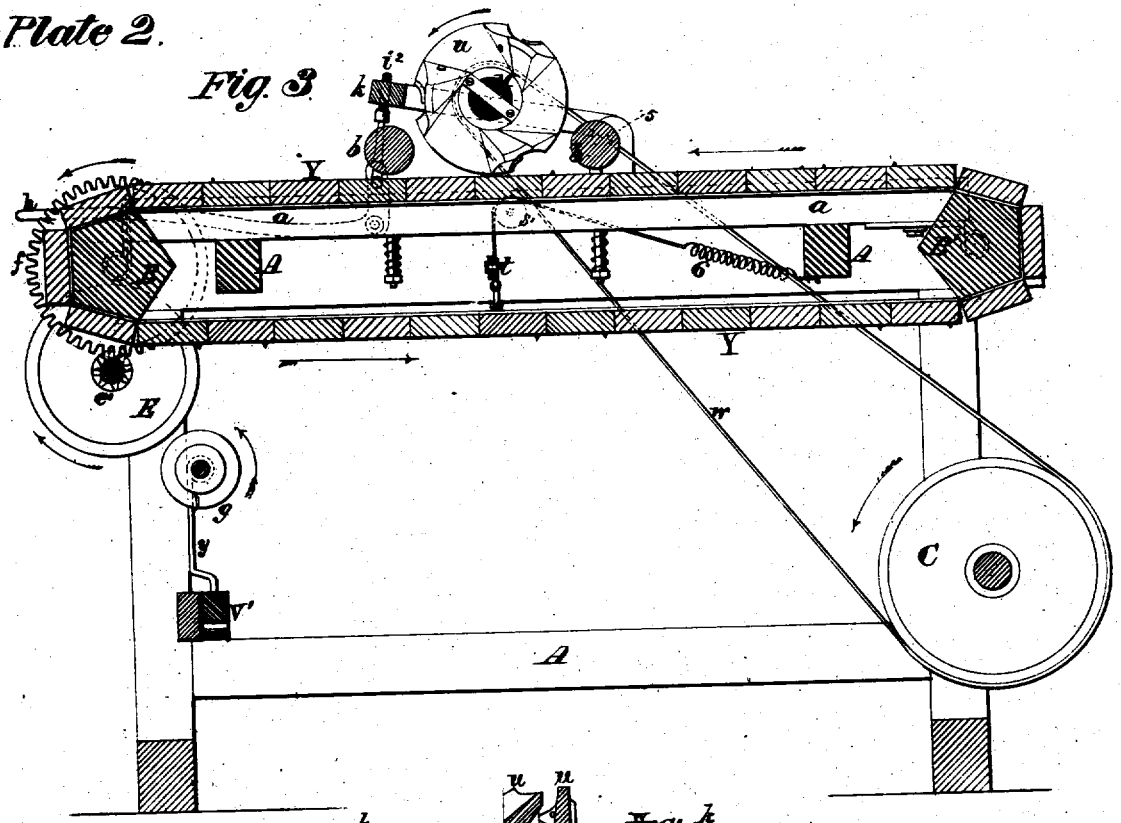
Figure 4:
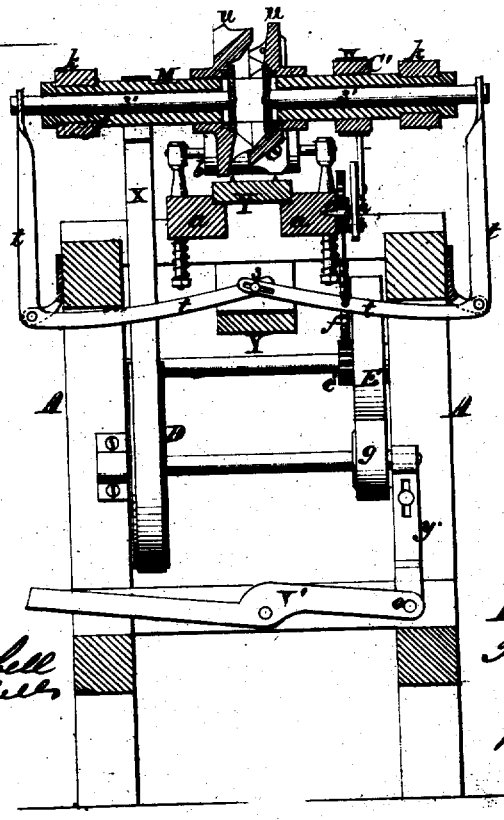
Figure 5:
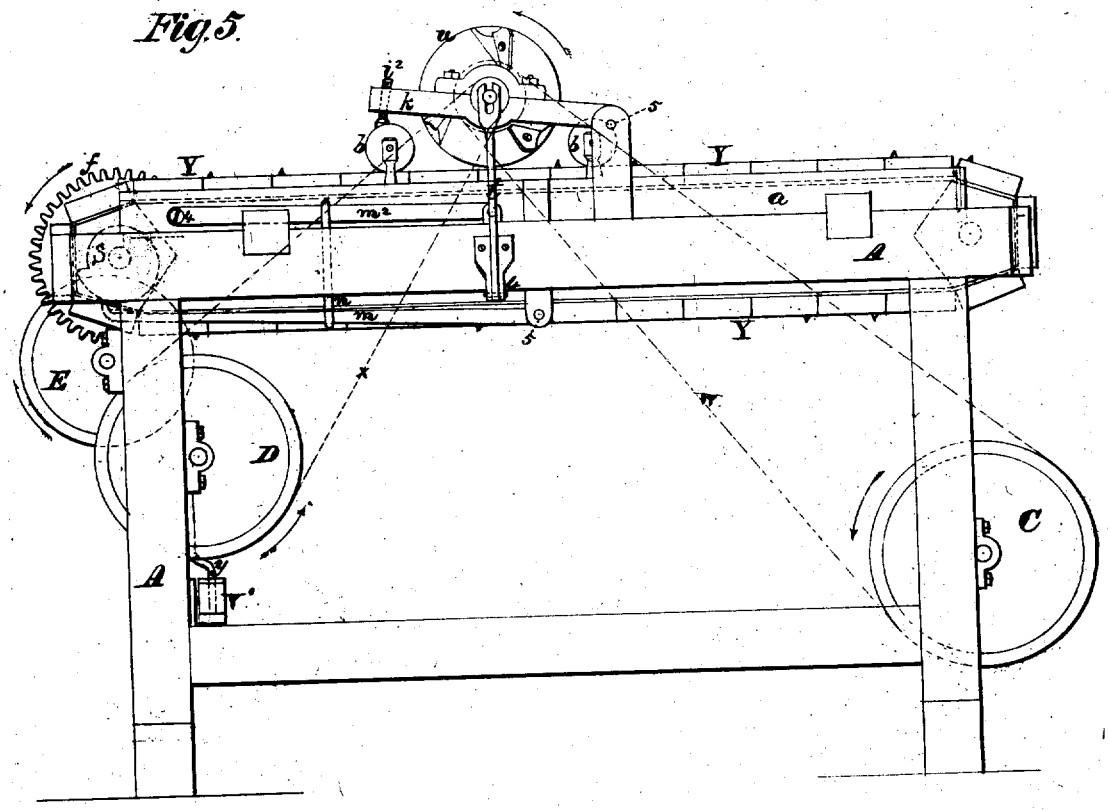
Figure 6:
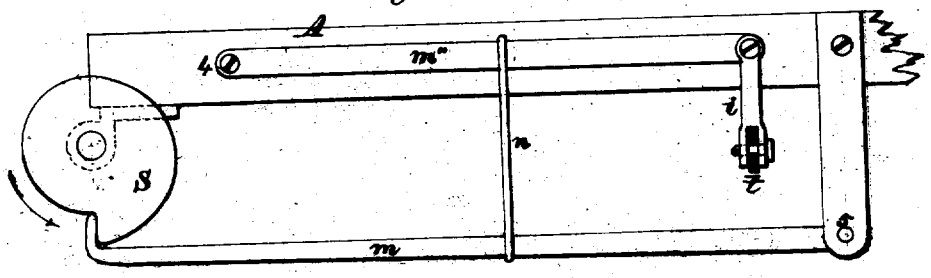

Figure 1, Plate 1, is an elevation of one side of the machine. Fig. 2, Plate 1, is a top view of the machine. Fig. 3, Plate 2, is a section taken vertically and longitudinally through the center of the machine, indicated by dotted line Y Y in Fig. 2. Fig. 4, Plate 2, is a section taken transversely through the machine in the vertical plane indicated by dotted lines *x x* in Figs. 1 and 2. Fig. 5, Plate 3, is an elevation of the sides of the machine opposite that shown by Fig. 1. Fig. 6, Plate 3, is a view in detail of the cam-pattern and levers for giving lateral movements to the cutter-heads.

The first part of my invention relates to the combination of an endless feed-bed and laterally-acting rotating cutter-heads in such a manner that each section of the endless feed-bed shall pass under the cutter-heads during each alternate lateral movement of the cutter-heads.

The second part of my invention relates to the combination of a cam, spring, and levers, with cutter-heads, so as to produce an alternate lateral movement of the cutter-heads.

The third part of my invention relates to the use of a connecting link or stirrup between parallel levers, so as to produce the lateral movement in a greater or lesser degree.

A represents a rectangular frame, upon which are arranged the proper and necessary devices and mechanism for producing the operations of spoke-dressing, as hereinafter described. This frame has upon it two horizontal ways, *a a*, arranged parallel to each other, and extending from one end of the machine to the other, which serve to support, guide, and keep in place the endless feed-bed *y*, upon which the material is supported and fed to the cutters. This endless feed-bed is composed of a number of short sections connected together and moving in ways *a a* around drums B B′, situated at opposite ends of ways *a a*. Equidistant from each other pins *z z* are inserted in the surface of the feed-bed, dividing the same into spaces or sections of sufficient length for a spoke-blank, one half of which are adapted to a spoke-blank and the other half to the spoke with one side dressed.

*b b* are pressure-rollers, for holding down the spoke while being acted upon by the cutter-heads *u u*.

*k* is a bail or swinging frame, which serves as the bearing for the arbor M, and is jointed at 5 5 to upright standards rising from frame A.

C is a pulley, and *w* a belt, which, connecting with pulley C upon arbor M, imparts motion to the cutter-heads *u u* in the direction indicated by the arrows. From arbor M motion is given by belt X to the shaft upon which is pulley D and friction-pinion *g*, which latter imparts motion to friction E, spur-pinion *e*, and that to spur-wheel *f*, upon the same shaft with drum B. The shaft (upon which is pinion *g*) and its bearing *y* are vibratory. At O, *y* is pivoted to the lever *v*, which is the means of placing pinion *g* and wheel E in and out of gear, which arrangement is for stopping and starting the feed motion of the feed-bed *y*. Stud-pin C (seen in the rim of spur-wheel *f*) acts, when in place, as a wiper or lifter, which, at each revolution of wheel *f*, moves lever *h*, adjustable device $i^2$, and bail *k*, producing a falling and rising motion to the cutter-heads *u u*. With this mechanism the machine is adapted to the dressing of spokes that are either regular or irregular in their horizontal profile. Similar devices have heretofore been used in some of the spoke-dressing machinery for producing similar results; hence I do not claim the mechanism above described, nor the results produced thereby, as part of my invention.

Device $i^2$ is connected to lever *h* and bail *k* in such a manner that its length may be increased or diminished, the effect of which would be to raise or lower the cutter-heads, adapting them to spokes differing in thickness. The hubs of the cutter-heads are connected through the slots in arbor M to the inner ends of the inside rods 3 3. The bent arms *t t* have a loose-jointed connection at 3, and are suitably connected to the inside rods by forks, as seen in Figs. 1, 2, and 5. The levers *m m''* are parallel to each other, as shown in Fig. 6, Plate 3. Lever *m* is hinged at 5. The opposite end is suspended by stirrup *n* from lever *m''*, which lever is hinged at 4, and the opposite end connected with bent arms *t t* by link *i*. Cam-pattern S is upon the same shaft with drum B, and in contact with the free end of lever *m*.

When cam S is put in motion, it depresses the levers *m m''* and the horizontal parts of arms *t t*, the effect of which is to move the cutter-heads at each revolution of the cam nearer each other. Stirrup *n* is movable upon the levers *m m''*, and is the mechanism between the cam S and the cutter-head *u u* for producing a greater or lesser movement of the heads in the line of their arbor, producing, at the will of the operator, any desired taper in the spoke. The outward movement of the cutter-heads is produced by spring 6, connected to frame A at one end, and to one of the bent arms *t t* by means of a cord passing over a grooved pulley.

The cutter-heads are provided with suitably-shaped knives for dressing a portion of the spoke with a flat surface, and other portions of the spoke oval or round, according to the action of the cam-pattern S in its rotary movement. The lateral movement of the cutter-heads *u u* will correspond in point of time with the movement of a section of the feed-bed past the cutter-heads *u u*.

Operation: The cam and feed-works being so adjusted that the heads will open immediately after the completion of a spoke, power is applied to pulley C, and motion is transmitted to cutter-heads *u u*, and thence to pulley D and to the feed-bed *y*, by depressing lever *v*, whereby pinion *g* and wheel E are brought in contact. The machine being in motion, a bolt or spoke-blank is placed in position, tenon end forward, upon the section fitted for the spoke the first time through, and is there kept in position by the pressure-rollers *b b* while being dressed upon one side. Only the straight parts of the cutters act upon the spoke until it has passed far enough for the tenon. Then the heads are gradually forced toward each other by the action of cam-pattern S bringing the ovate parts of the cutters to act upon the blank, and, as it moves along, the cutters produce the ovoidal and tapering form of the spoke until one side of the spoke is dressed. On the passage of one spoke and the arrival of another upon the section adjusted for the spoke, with one side of it dressed, the cam-pattern S allows a quick outward movement of the cutter-heads *u u* (which is effected by the action of spring 6 upon bent arms *t t*) to their original and proper position for the completion of the spoke, which will be accomplished as the section of the feed-bed passes under the cutter-heads. Thus the cutter-heads are alternately automatically forced inward and outward—in the line of their arbor—as the feed-bed carries the spoke along, and the operation of spoke dressing may be continued indefinitely without stopping the machine for the purpose of placing in position the blank spoke, or for its removal after having been dressed.

Having described my invention and method of operating the same, what I claim as new, and wish to secure by Letters Patent, is—

1. The endless feed-bed *y*, in combination with laterally-acting rotating cutter-heads *u u*, substantially as shown and described, and for the purposes herein specified.

2. The cam-pattern S, levers *m m''*, stirrup *n*, link *i*, bent arms *t t*, and spring 6, in combination with cutter-heads *u u*, substantially as shown and described, and for the purposes herein specified.

3. The movable connecting-stirrup *n* and and levers *m''*, in combination with bent arms *t t*, cam-pattern S, and cutter-heads *u u*, substantially as shown and described, and for the purposes herein specified.

R. H. BOYNTON.

Witnesses:
ALVIN SALISBURY,
JAMES HALL.